INVENTOR.
MERRITT W. WOLFE
BY
J.B. Holden
ATTORNEY

Jan. 3, 1967　　　M. W. WOLFE　　　3,296,048
REPAIR ELEMENT AND METHOD OF USE
Filed Sept. 17, 1962　　　2 Sheets-Sheet 2

INVENTOR.
MERRITT W. WOLFE
BY
J.B. Holden
ATTORNEY

United States Patent Office 3,296,048
Patented Jan. 3, 1967

3,296,048
REPAIR ELEMENT AND METHOD OF USE
Merritt W. Wolfe, Akron, Ohio, assignor to The Goodyear Tire & Rubber Company, Akron, Ohio, a corporation of Ohio
Filed Sept. 17, 1962, Ser. No. 223,915
9 Claims. (Cl. 156—97)

This invention relates to a repair device and method of applying the same. More particularly, it comprises a device adapted to seal openings in rubber articles in a wide variety of structures including the relatively stiff carcasses of pneumatic tires used on off-the-road equipment. It also includes the method of applying such a repair element without having to remove the pneumatic tubeless tire from the rim. A more specific aspect of this invention relates to the repair of tires using a tube.

Heretofore punctures of less than about one inch in diameter have been repaired by use of rubber patches or rubber plugs which require special tools for insertion into the hole. As the holes in tires exceeded about 0.5 inch in diameter their repair has become a very difficult problem in that the tire had to be sent to a repair station where vulcanization equipment was available for a complete section repair. As a consequence there has been considerable emphasis recently to develop a method for at least temporarily repairing a puncture in a tubeless tire where the hole puncture opening is in excess of 0.5 inch, for instance, 2 inches, without the need to remove the tire from the vehicle. A temporary repair of this sort is particularly needed as the job of removing the tire from a loaded vehicle is made more difficult by the weight of the material on the vehicle. Not only is there a need for a temporary repair but an easily applied permanent repair is needed, too. Consequently, an object of this invention is to provide a repair element and a method for its use which will permit temporary and permanent repairs to be made while the tubeless tire is still on the vehicle.

The principal object of the present invention is to provide a novel type of sealing member which may be inserted in the hole of the pneumatic tubeless tire while the tire is still on the vehicle and thereby eliminate the need for demounting and remounting the tire after it has been repaired. A further object is to provide a sealing member which will not move endwise within the hole with use. Another object of this invention will appear in the course of the following description.

To the accomplishment of the foregoing and related ends, said invention then consists of the means and method hereinafter fully described and particularly pointed out in the claims. The annexed drawing and the following description set forth in detail certain means and methods embodying the invention.

Figure 1:
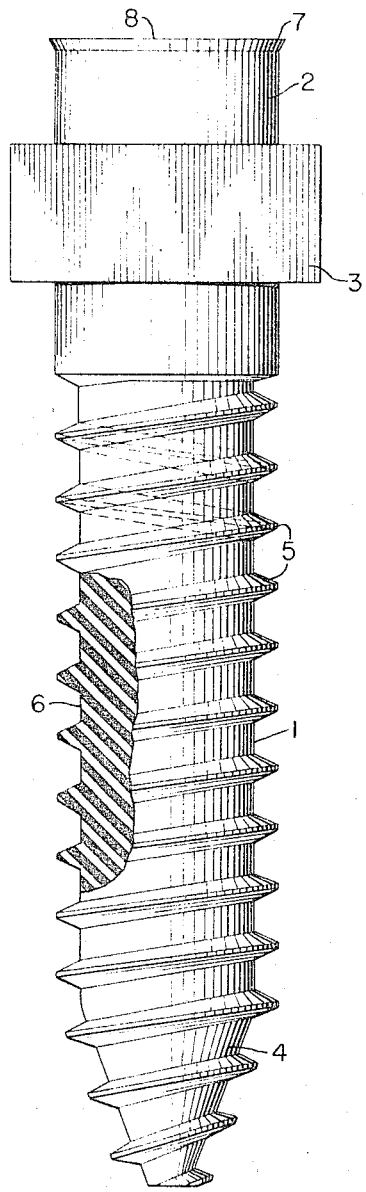
Figure 2:
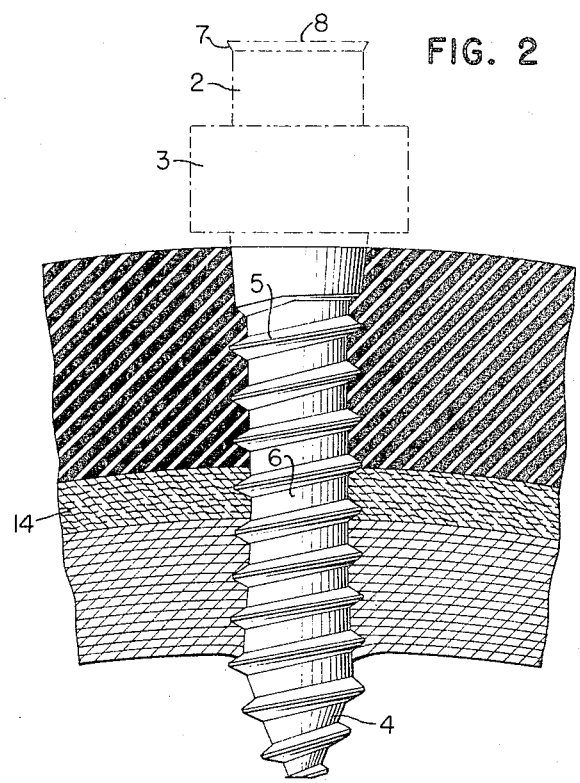
Figure 3:
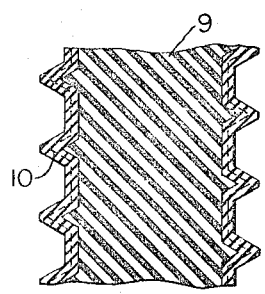
Figure 4:
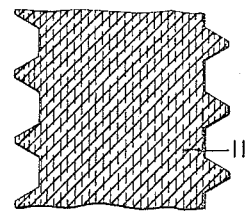
Figure 5:
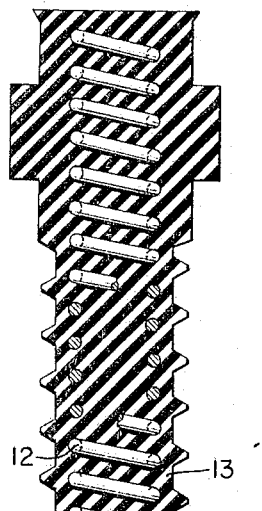

In said annexed drawing FIG. 1 is a side elevation of the repair element embodying the principle of the invention. FIG. 2 is a view in partial cross section of the pneumatic tire showing the repair element in place within the hole in the tire. FIGS. 3 and 4 are partial views in cross section of the repair element showing stiffening or reinforcing members positioned therein. FIG. 5 is a side elevation view of the repair element which has a spring type stiffening member.

Figure 6:
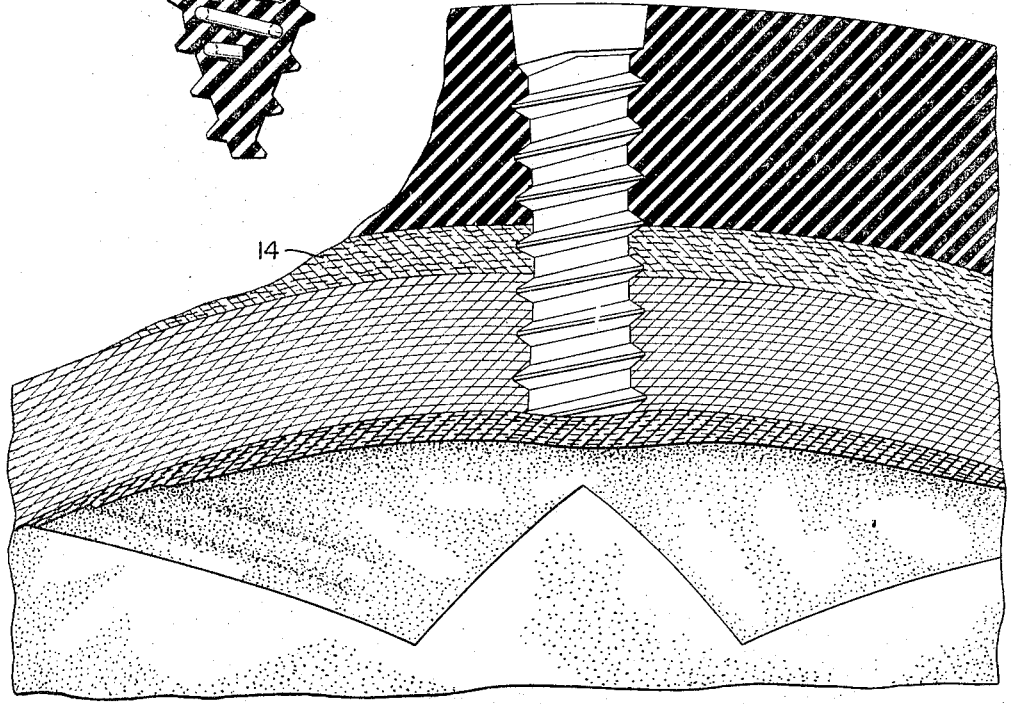

FIG. 6 is a view in partial cross-section of a tube type tire showing the repair element in place in the hole with a cross shaped patch in place on the inside of the tire to protect the tube from the repair element.

As is clearly shown in FIGS. 1 and 2 of the drawing the repair element in a simpler form comprises an elongated member 1 having a cylindrical section 2 with a wrenching means 3 such as a square or hexa-head positioned intermediate thereof, a tapered end section 4 having a helical ridge 5 extending from the end of the elongated member through the intermediate section 6.

The elongated member preferably has a flange 7 near the end 8 thereof as this flange permits the distance between the wrenching means and the end 8 to be minimized and yet the elongated member still may be handled when cold without tongs or the fingers slipping off of the cylindrical section between the wrenching means and the end 8. Preferably the flange is in the shape of a frustum of a cone.

Another form of the repair element is shown in FIG. 3 where the core 9 is of a relatively hard material such as metal or hard rubber with its helical ridge being formed of a rubber coated fabric 10 or a rubber reinforced with fabric such as nylon flock or metal flock.

Still another way of using stiffening members to give the repair element sufficient rigidity to be screwed into the hole of a tire is shown in FIGS. 4 and 5. The stiffening members 11 such as nylon flock, resinous materials having low gel points or metallic flock are dispersed throughout the rubber forming the body of the repair element of FIG. 4. The stiffening member of FIG. 5 is a spring 12 positioned longitudinally within the rubber 13 of the repair element.

The spring within the element of FIG. 5 gives the tread rubbers or other suitably compounded rubber sufficient rigidity when cooled to permit a repair element to be used having a larger diameter relative to the diameter of the puncture than can be used without the inclusion of the stiffening member or members. Also, it has been found beneficial to use stiffening or abrading resistant material with the repair element where the tire contains flock wire 14 such as that shown in FIGS. 1 and 6.

The rubber of the repair element should have a Shore A hardness of at least 60 and preferably in the range of 75–95. Where the rubber is either natural or a synthetic polymer or copolymer of a conjugated diene, it is a preferred practice to reinforce the elongated member 1 with a reinforcing or stiffening member in the manner shown in FIGS. 3, 4 and 5.

When the elongated member is made of polyurethane rubber there is no need for reinforcing fabric, when the polyurethane has a Shore hardness at 75° F. of at least 60 and preferably in the range of 75 to 95 and a tensile strength of at least 2000 and preferably 3500 to 5500 pounds per square inch. Also, the use of the polyurethane repair element gives a more permanent type repair than is obtained with the other reinforced rubbers. Polyurethane rubbers of this type are well known and may be made by forming a liquid reaction mixture comprising a reactive hydrogen containing polymeric material such as the polyetherpolyols, polyesterpolyols and polyesteramides of about 700 to 3500 molecular weight and about 1.1 and preferably 1.3 to more than 2 mols of an organo polyisocyanate for each mol of reactive hydrogen-containing polymeric material and a sufficient amount of a cross linking agent selected from the class consisting of the diamines, the glycols and the amino alcohols to react with the excess of organo polyisocyanate and then pouring the liquid reaction mixture into a mold having the shape shown in FIG. 1 where the liquid reaction mixture is heated and cured to give a repair element of the desired size.

The polyesters used in the practice of this invention are those conventionally prepared by the condensation reaction between one or more dicarboxylic acids and one or more glycols. Representative examples of the dicarboxylic acids which may be used in preparing these polyesters are: succinic, glutaric, adipic, pimelic, suberic, azelaic and sebacic. Of these acids adipic, glutaric and sebacic are particularly preferred. Representative examples of the glycols which may be used to prepare the polyesters are ethylene glycol, propylene glycol, butylene glycol, pentamethylene glycol and hexamethylene glycol. Of these ethylene glycol, propylene glycol and mixtures of these two glycols are particularly preferred.

As indicated above, the polyester should preferably have an average molecular weight of from 1500 to 2500 and a corresponding hydroxyl number of from 45 to 75 with an acid number not greater than 5. The molecular weight range indicated defines the polyesters which are of the proper consistency for pouring in the liquid state either at room temperature or at relatively low temperatures, and which yield cured polymers possessing outstanding physical properties.

Of particular interest are the polyesters prepared from adipic acid and a mixture of glycols containing approximately 80 mol percent of ethylene glycol and 20 mol percent of propylene glycol in the molecular weight range of approximately 2000 and having an acid number not greater than 2.

The polymeric polyether polyols such as polypropylene ether glycol or polytetramethylene ether glycols having molecular weights of about 1500 to 3500 may be used in place of the polyesters for making the polyurethane repair elements of this invention. Although it should be appreciated that the polyether urethanes usually do not have as much tear resistance and as high a tensile strength properties as the corresponding polyester urethanes.

As is well recognized in the production of polyurethane products, an excess of diisocyanate is generally employed to insure the cure of the polyester and to provide sufficient points of reaction with other ingredients containing reactive hydrogen such as ortho dichlorobenzidine or methylene-bis-ortho-chloraniline.

Any of a wide variety of organic diisocyanates may be employed to prepare the polymers of this invention including aromatic, aliphatic and cycloaliphatic diisocyanates and mixtures of two or more of these. Representative compounds include the meta tolylene diisocyanates such as 2,4-tolylene diisocyanate and 2,6-tolylene diisocyanate; m-phenylene diisocyanate; 4,4'-diphenylene diisocyanate; 4,4'-diphenylene methane diisocyanate; 1,5-naphthylene diisocyanate; dianisidine diisocyanate; 4,4'-tolidine diisocyanate; 4,4'-diphenyl ether diisocyanate; 1,4-tetramethylene diisocyanate; 1,6-hexamethylene diisocyanate; 1,10-decamethylene diisocyanate; 1,4-cyclohexylene diisocyanate; 4,4'-methylene-bis-(cyclohexyl isocyanate) and 1,5-tetrahydronaphthylene diisocyanate. Of these the aromatic isocyanates, and particularly the tolylene diisocyanates, 4,4'-tolidine diisocyanate and 4,4'-diphenylene methane diisocyanate are preferred. The diisocyanates may contain other substituents such as alkyl or halogen but should contain no groups such as hydroxyl or amino groups which are reactive with the isocyanate radicals.

Suitable crosslinkers are the class of chemical compounds known as diamines, glycols and amino alcohols. The specific nature of these cross linkers are well known and described in the literature. The specific diamines that are preferred for making cast polyurethanes are the chloro diamines as these materials yield a reaction mixture which has sufficient pot life to permit liquid castings to be made without having to resort to special operating conditions.

A particularly effective formulation from the standpoint of the physical properties of the cured product and the physical nature of the liquid mixture is one containing approximately 100 parts by weight of a polyester having an average molecular weight of approximately 2000, approximately 6 parts by weight of ortho dichlorobenzidine and approximately 23 parts by weight of 3,3'-dimethyl 4,4'-diphenylene diisocyanate. Methylene-bis-ortho chloroaniline also can be used instead of ortho dichlorobenzidine with the above recipe to make a cast repair element which is suitable for permanent as well as temporary repair.

The castable polyurethane reaction product of this invention is prepared by heating the polyester or a polytetramethylene ether glycol to a temperature of from 100° C. to 140° C., adding the diisocyanate followed by a thorough mixing or blending of the reactants for from 30 to 45 minutes, adding a cross-linker such as a diamine followed by a thorough blending of this reactant into the mixture for approximately one minute and by pouring the complete reaction mixture into a mold of the desired size and shape. While the reaction mixture will set up without the application of additional heat, it has been found expedient to place the cast product into a heated air oven or to heat the mold by some other means, as for instance in a curing press in order to accelerate the rate of cure of the reaction mixture. The application of pressure during the oven curing operation has been found not to be necessary or required. However, the application of pressure to products cured in a press has been found to produce beneficial results.

The invention is further illustrated but not limited by the following examples, where the parts and percentages are by weight unless otherwise indicated.

*Example 1*

A polyester (100 parts) prepared from adipic acid and a mixture of glycols containing 80 mol percent of ethylene glycol and 20 mol percent of propylene glycol and having an average molecular weight of approximately 2000 and a hydroxyl number of approximately 57 and an acid number of 0.8 was heated at 120° C. for one hour under a vacuum of 20 millimeters of mercury. To this polyester 23 parts by weight of 3,3'-dimethyl-4,4'-diphenylene diisocyanate were added. The mixture was stirred for 30 minutes at 120° C. under a vacuum of 20 millimeters of mercury. Ortho dichlorobenzidine (6 parts by weight) was then added and mixed with the polyester and diisocyanate for one minute, after which the complete reaction mixture was poured into a mold and cured for one hour at 120° C. The cast repair element was then removed from the mold and baked for an additional 20 hours at 120° C.

A repair element also was made by using butane diol instead of ortho dichlorobenzidine as the cross-linker in accordance with the above procedure.

Normally a hole in a pneumatic tubeless tire caused by the penetration of a stick, rock, or other sharp object can be repaired in accordance with this invention without removing the tire from the vehicle. For best results, the hole is cleaned and enlarged to give a smooth round hole all the way through the tire. This cleaning and enlarging of the hole can be accomplished by drilling the debris from the hole with a drill. Another method of cleaning out the hole may be accomplished by burning with a hot rod. By this burning technique the carcass cord ends are sealed and the thin layer of burned rubber has a lubricating value during the insertion of the repair element. The element of FIG. 1 which has been cooled to a temperature less than 0° F., preferably —35° F. or lower depending on other physical qualities of the screw and hole size, in a Dry Ice-kerosene bath or with other suitable refrigeration means is inserted into the hole in the tire and turned with a wrench or other means to force the element while still frozen through the hole in the tire. Then the head end of the repair element is cut off smooth with the surface of the tire with a knife or hacksaw. This tire when adequately inflated is ready for further use. Where the repaired tire is to be equipped with a tube then it is desirable to cut the tapered section of the repair element away even with the inside of the tire and then place a conventional patch over the end of the repair element that was cut away in the manner shown in FIG. 6.

It has been found to be desirable to coat the inside of the hole and the repair element with a lubricating cement prior to the insertion of the repair element into the hole. The use of the lubricating cement performs several functions: (1) it facilitates the insertion of the element into the hole; (2) it also reduces the amount of moisture which tends to condense on the cold element from being transported inside the tire carcass; and (3) the cement also increases the resistance to removal of the element from the tire carcass; and (4) provides air sealing between the hole and the repair element.

The size of the repair element at the thread root diameter should be at least greater than the maximum dimension of the hole to be sealed. It is preferred that it be at least 1.5 to 2 times the size of the maximum diameter of the hole to be sealed as this appreciably enhances the resistance to removal of the plug. Of course, it should be apparent that as the size of the hole in the tire increases the oversize of the repair element is reduced accordingly.

Any of the usual liquid rubber tread cements may be used as the lubricant for the repair element. These cements usually contain less than about 50% by weight of solids with the rest of the cement being a suitable solvent for the solids. Generally the suitable solvents are the aromatic naphthas, light petroleum distillates, the pure hydrocarbons such as benzene, hexane, etc. The solid content of the cement usually comprises from about 5 to 40% of a rubbery polymer such as natural rubber or the synthetic rubbers, for example, the polymers and/or copolymers of the conjugated dienes such as butadiene, isoprene, chloroprene, etc. In addition to the rubber the solid content of the cement may contain from about 10 to 35% of a resinous material such as, for instance, the phenol-formaldehyde resins. The cement also contains a sulfur curing agent such as sulfur, accelerators, reinforcing agents and the other compounding agents normally used in tread cements.

The prepolymers, such as those of Examples 1, 2 and 3 may also be used as a cement in the practice of this invention.

A special cement which has been found to be exceptionally good for use in the practice of this invention is the polyurethane cement obtained when dimethyl formamide, dimethyl acetamide, dimethyl propionamide and dimethyl sulfoxide or mixtures of these solvents is used to dissolve a cured polyurethane of the type shown in Example 2. Normally these polyurethane cements will contain from about 10 to 50% by weight of the cured polyurethane.

*Example 2*

Into a suitable container was placed 900 grams of a polyester prepared from the condensation of approximately 1.1 mols of a mixed glycol of ethylene glycol, diethylene glycol, and butanediol-1,4 in equal molar quantities with approximately 1.0 mol of adipic acid. This polyester had an hydroxyl number of approximately 60 and an acid number of approximately one (resulting in a "reactive number" of 61) and a molecular weight of approximately 1800. To this polyester were added 92.7 grams of a mixture of 98 parts by weight of 2,4-tolylene diisocyanate and 2 parts by weight of 2,6-tolylene diisocyanate. This mixture was stirred for 36 minutes while being maintained at a temperature ranging from 50° C. to 63° C. (This partially diisocyanate-modified polyester is called a prepolymer.) To this prepolymer were added 222 grams of a mixture of 98 parts by weight of 2,4-tolylene diisocyanate and 2 parts by weight of 2,6-tolylene diisocyanate, and 13.5 grams of castor oil. The mixture was then transferred to a 2-quart Baker-Perkins Sigmablade mixer and 6.3 grams of catalyst (the condensation product of 1 mol of aniline and 4 mols of n-butyraldehyde) were added. After mixing for 4 minutes, 27.3 grams of water were added at which time the mixture began to foam, this foam was destroyed by the shearing action of the sigma-blades. Some 3 minutes after the addition of the water, 5 cubic centimeters of N-methyl morpholine (another catalyst) were added. After this mixture had been allowed to mix for a period of approximately 20 minutes in the Baker-Perkins mixer, the formation of elastomer was observed. The mixing was continued for an additional 30-minute period, during which time the elastomer was reduced to a powdered form. This was done to allow ease of handling and removal of the elastomer from the mixer. This powdered elastomer was heated in a 100° C. oven for 60 minutes to complete the cure.

A hundred grams of the powdered cured polyurethane was dissolved in 150 grams of dimethyl formamide. This cement was used to lubricate the inside of a cleaned and enlarged puncture hole in a tire and to coat a polyurethane repair element prior to the insertion of the cold repair element into the hole of the tire. While the head of the polyurethane repair element was still frozen, a hacksaw was used to cut it off even with the tread of the tire. The repaired tire was then inflated with air and put into service on a wood hauling buggy. It has been in use for over 300 hours and still does not show any loss of inflation.

*Example 3*

A mol of polytetramethylene ether glycol of about 1800 molecular weight was reacted with about 1.8 mols of 4,4'-diphenylene methane diisocyanate to form a prepolymer, then about .8 mol of methylene bis ortho chloro aniline was added to and mixed into the prepolymer. The resulting liquid reaction mixture was poured into a mold for a repair element before the reaction mixture set. The mold containing the liquid reaction mixture was placed in a 100° C. oven until the reaction mixture had set and cured. This polyurethane repair element having a diameter of 1.5 inches was used to repair a hole about 1 inch in diameter in a pneumatic tire. This repaired tire after several hours of use was still inflated.

The head of the repair element need not be cut away where it is desired to use this as a part of the tread or traction increasing means.

This invention permits a pneumatic tire which has a puncture hole having a diameter of at least 0.5 inch to 3 inches or more to be repaired without demounting and remounting the tire of the rim. This invention further permits a polyurethane repair element to be screwed into the hole in the tire since the repair element which has either polyurethane rubber or rubber reinforced with a stiffening means hardens up faster than the tire rubber at lower temperature. For instance, a chilled polyurethane repair element increases 20 to 30 Shore A hardness units as the temperature of the element is changed from ambient to 0° F. and even lower, say to −65° F. On the other hand, it is unexpected that the flexing of the polyurethane repair element in the tire prevents it from hardening to the point where it would work out of the tire even when the tire is operating at sub-zero temperatures.

While certain representative embodiments and details have been shown for the purpose of illustrating the invention, it will be apparent to those skilled in this art that various changes and modifications may be made therein without departing from the spirit or scope of the invention.

I claim:

1. A process for repairing a puncture in a pneumatic tire comprising the steps of (1) cleaning the puncture, (2) screwing into and through the puncture a polyurethane repair element at least larger than the puncture opening and having a helical ridge extending from at least the intermediate cylindrical section thereof to at least near the outside end of the tapered section of said element with the surface of said repair element being in contact with a rubber cement while it is being screwed into the hole and then (3) the cutting away of at least that portion of the polyurethane repair element which extends beyond the outside surface of the tire to leave the intermediate cylindrical section having the helical ridge sealing the puncture opening.

2. A process for repairing a puncture in a pneumatic tire comprising the steps of (1) cleaning and enlarging the puncture, (2) inserting into and through the puncture a rubber repair element at least larger than the puncture opening and having a helical ridge extending from at least the intermediate section thereof to at least near the outside end of the tapered section of said element while said element is at a temperature less than about 0° F. and (3) cutting away that portion of the rubber repair element which extends beyond the outside surface of the tire.

3. The process of claim 2 wherein the repair element contains at least one stiffening member disposed therein.

4. A process for repairing a puncture in a pneumatic tire comprising the steps of (1) cleaning the puncture, (2) chilling a polyurethane repair element having a helical ridge extending from the intermediate section thereof to near the outside end of the tapered section of said element, (3) applying a rubber cement to the surface to which the repair element is to be brought in contact, (4) inserting the repair element into the puncture while said element is below 0° F., and (5) cutting away the excess of the repair element.

5. A process for repairing a puncture in a pneumatic tire comprising the steps of (1) cleaning the puncture, (2) chilling the rubber repair element having a helical ridge extending from the intermediate section thereof to near the outside end of the tapered section of said element, said repair element having at least one stiffening member disposed therein, (3) then inserting the chilled rubber repair element into the puncture and (4) removing the part of the repair element protruding from the tire.

6. The process of claim 5 wherein the repair element has a stiffening member composed of textile fabric.

7. The process of claim 5 wherein the repair element has a stiffening member which is a spring.

8. A process for repairing a puncture in a pneumatic tire comprising the steps of (1) cleaning the puncture to at least enlarge the puncture, (2) chilling a polyurethane repair element having a helical ridge extending from the intermediate section thereof to near the outside end of the tapered section of said element, steps (1) and (2) being taken without regard to order of precedence, (3) applying a rubber cement to the surface to be in contact with the puncture and the repair element, (4) inserting the repair element into the puncture by a wrenching action while said element is below about 0° F., and (5) cutting away the excess of the repair element on the outside of the tire.

9. The process of claim 8 wherein the polyurethane repair element has a Shore hardness at 75° F. of at least 60 and a tensile strength of at least about 2000 pounds per square inch.

References Cited by the Examiner

UNITED STATES PATENTS

| | | | |
|---|---|---|---|
| 570,942 | 11/1896 | Merritt | 152—370 |
| 1,913,198 | 6/1933 | Geyer | 29—149.5 |
| 2,342,195 | 2/1944 | Heintz | 152—367 |
| 2,469,849 | 5/1949 | Silver | 156—122 X |
| 2,692,001 | 10/1954 | Hawkinson | 156—97 X |
| 2,739,352 | 3/1956 | Watson | 156—97 X |
| 2,803,284 | 8/1957 | Mullen | 152—367 |
| 2,866,494 | 12/1958 | Sanderson | 156—97 |
| 2,966,189 | 12/1960 | Chambers et al. | 152—370 |
| 2,974,715 | 3/1961 | Soares et al. | 156—97 |
| 3,035,626 | 5/1962 | Mullen | 152—370 |

FOREIGN PATENTS

| | | |
|---|---|---|
| 831,501 | 3/1960 | Great Britain. |
| 875,709 | 8/1961 | Great Britain. |

EARL M. BERGERT, *Primary Examiner.*

A. WYMAN, R. C. RIORDON, H. ANSHER, C. W. HAEFELE, *Assistant Examiners.*